United States Patent [19]

Ashley

[11] Patent Number: 4,522,957
[45] Date of Patent: Jun. 11, 1985

[54] PROCESS FOR PREPARING CURABLE POLYOLEFIN POLYMERS

[75] Inventor: Billy H. Ashley, Wadsworth, Ohio

[73] Assignee: A. Schulman, Inc., Akron, Ohio

[21] Appl. No.: 414,646

[22] Filed: Sep. 3, 1982

[51] Int. Cl.³ .................... C08K 9/00; C08K 9/06; C08K 5/01
[52] U.S. Cl. .................... 523/212; 523/216; 524/477; 525/53; 525/387; 427/222; 366/170
[58] Field of Search ............. 523/212, 216; 524/477; 525/53, 387

[56] References Cited

U.S. PATENT DOCUMENTS

| | | | |
|---|---|---|---|
| 3,000,841 | 9/1961 | Ware | 524/477 |
| 3,362,688 | 1/1968 | Fischer | 366/170 |
| 3,736,173 | 5/1973 | Okada | 427/222 |
| 3,974,132 | 8/1976 | Valdiserri | 525/387 |
| 4,005,254 | 1/1977 | MacKenzie, Jr. | 523/212 |
| 4,006,283 | 2/1977 | MacKenzie, Jr. et al. | 525/387 |

FOREIGN PATENT DOCUMENTS 3925792 12/1964 Japan .

*Primary Examiner*—Joseph L. Schofer
*Assistant Examiner*—N. Sarofim
*Attorney, Agent, or Firm*—Gordon W. Hueschen

[57] ABSTRACT

The disclosure is directed to improvements in a process for preparing curable polyolefin polymers in which a mass of dry, discrete, free-flowing particles of polyolefin polymer is tumbled in admixture with a curing agent effective to cause curing when the finished product is subjected to curing temperature, which comprises tumbling said mass in two separate and discrete steps in which essentially all of the curing agent is incorporated into said mass in the first tumbling step and equilibration between the curing agent and the polymer is effected in the second tumbling step while maintaining in both tumbling steps a temperature above the melting point of said curing agent but below both the agglomerating temperature and the curing temperature and, at least in the second tumbling step, a temperature which provides equilibration between the curing agent and the polymer; and thereafter tumble-cooling the thus-treated mass until a dry, discrete, free-flowing mass of polymer particles is obtained. The tumbling steps are advantageously effected in a Zig-Zag Blender TM, wherein incorporation of the curing agent is effected by spraying liquid curing agent onto particles of said polymer while they are separated from said mass and dispersed in the atmosphere which envelopes said mass.

20 Claims, 1 Drawing Figure

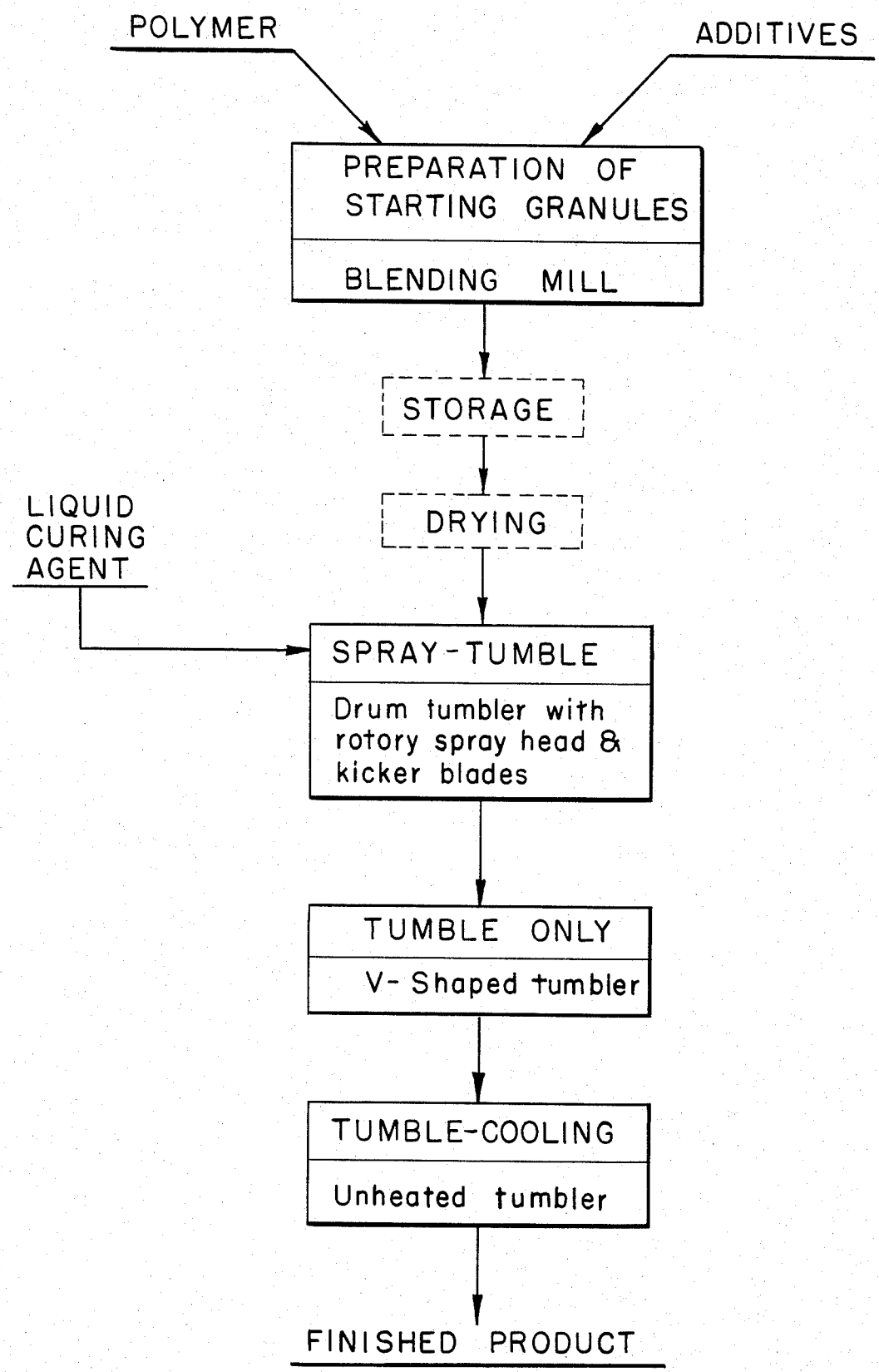

PROCESS FOR PREPARING CURABLE POLYOLEFIN POLYMERS

BACKGROUND OF THE INVENTION

1. Field of Invention

The invention relates to a process for preparing curable polyolefins and is particularly directed to a process for preparing curable polyolefin polymers in the form of discrete, dry, free-flowing particles.

2. Prior Art

In U.S. Pat. No. 3,731,173, issued May 29, 1973, reference is made to Japanese Pat. No. 501,087, granted Sept. 18, 1964, for a method of blending a polyolefin with a curing agent without the excessive thermal history and other disadvantages of the earlier process of using a Banbury TM mixer or like blending mill or kneading-type mixer. In this process, a curing agent, for example, dicumyl peroxide, is added to polyolefin powder or granules and the resulting mixture stirred by means of a drum tumbler, blender, or the like, at a temperature at which the curing agent is liquid but below the melting point of the polyolefin. This process, according to U.S. Pat. No. 3,736,173, while avoiding the disadvantages of the Banbury TM mixer process, is ineffective to produce dry, free-flowing, polymer granules or powder so that the resulting product is not suitable for handling by mechanized and pneumatic transfer equipment.

U.S. Pat. No. 3,736,173 discloses a process which purports to have avoided these disadvantages and to produce a dry, free-flowing product. In this process, the particles of polymer are blended with a curing agent in a "high speed" mixer, such as a Henschel mixer, operating at a speed sufficiently high that the surface of the polyolefin granules is molten in a moment in which portions of the granules come into friction and collision with each other, with the inside wall of the mixing tank, and with the stirring blades. The patent states further that it is impossible at all to obtain such high speed stirring by means of a low speed stirring apparatus such as a drum tumbler which is driven at most at 60 r.p.m. and that the desired result is obtainable by use of a high intensity, vortical-action mixer, or like high speed mixer. This process has the disadvantages that the surface of the granules must be made molten, thus risking agglomeration, and that the process is not suitable for polyolefin polymers which, either due to admixing with filler or the like, or blending with other polymeric material, have a low concentration of polyolefin polymer. It also has the disadvantage that the polymer particles are subjected to attrition by collision with high velocity stirring blades.

OBJECTS OF THE INVENTION

It is an object of the invention to provide a novel process for preparing curable polyolefins which is especially suitable for producing such a polymer in the form of dry, discrete, free-flowing particles or granules. It is an object of the invention to provide such a process which is not dependent on the use of kneading-type mixers or high speed mixers in the incorporation of the curing agent. It is a further object of the invention to provide a process of the class described in which no part of the polymer particles which contain curing agent is melted or deformed, as by local heating or kneading. It is still a further object of the invention to provide a process which is adapted to the processing of a wide variety of polymer blends and mixes. Still a further object is to provide a process in which the particles or granules treated are not essentially changed in physical dimensions during the processing and in which repelleting is not needed. Other objects of the invention are to avoid the disadvantages of the prior art processes and to obtain such advantages as will appear as the description proceeds.

SUMMARY OF THE INVENTION

The invention relates to a process for preparing curable polyolefin polymers and is particularly directed to a process for preparing such polymers in the form of dry, discrete, free-flowing particles and more particularly to a process wherein a mass of dry, discrete, free-flowing particles of polyolefin polymer is tumbled in admixture with a curing agent effective to cause curing when the finished product is subjected to a curing temperature, and to the improvement therein which comprises tumbling said mass in two separate and discrete steps in which essentially all of the curing agent is incorporated into said mass in the first tumbling step and equilibration between the curing agent and the polymer is effected in the second tumbling step while maintaining, in both tumbling steps, a temperature above the melting point of said curing agent but below both the agglomerating temperature and the curing temperature of said polymer and, at least in the second tumbling step, a temperature which provides equilibration between the curing agent and the polymer; and thereafter tumble-cooling the thus-treated mass until a dry, discrete, free-flowing mass of polymer particles is obtained. More particularly, the invention relates to a process of the class described in which the incorporation of the curing agent is effected by spraying liquid curing agent onto particles of the polymer while they are separated from said mass and dispersed in the atmosphere which envelopes said mass. Preferably, the polymer particles are fed continuously to the first tumbling step, the sprayed polymer particles are continuously withdrawn therefrom and continuously fed to the second tumbling step, and the sprayed particles are continuously withdrawn from the second tumbling step and continuously fed to the tumble-cooling step.

Advantageously, the polyolefin polymer is an ethylene-propylene-diene terpolymer and it is of advantage if it is a blend of this terpolymer and low density polyethylene homopolymer.

Still further advantage is obtained by including an amount of inorganic filler, say at least about 25 percent, which is effective to promote diffusion of the curing agent into the polymer particles, a result not accomplished in the process of U.S. Pat. No. 3,736,173, vide column 10, lines 14–37.

It is also of advantage if the polymer particles are shaped, discrete masses, such as pellets or cubes.

The invention also comprises one or more further features in which the particles have a maximum dimension of between about 0.5 and about 5 millimeters; and in which the starting polyolefin polymer is formed by kneading or milling polyolefin polymer and the kneaded or milled product is formed into discrete shapes or masses having a maximum dimension of between about 0.5 and about 5 millimeters.

The flow sheet of the drawing is illustrative of the process and apparatus used in carrying out the invention. The polymer and additives are blended in the preparation of the granules in a kneading or blending mill, such as a Banbury TM mill, and the blend is extruded and cut into discrete shapes or otherwise granulated. The granules are then fed to the spray-tumbling step or placed in storage awaiting such transfer. In case these prepared granules have been stored for any length of time, or in case they are purchased from an outside processor, it is desirable that they be dried in the drying step before being introduced into the spray-tumbling step.

The spray-tumbling step is carried out in a drum tumbler provided with a rotary spray head and kicker blades. Suitable such apparatus is disclosed in U.S. Pat. No. 3,362,688 and is marketed by Patterson-Kelley Company, Division of Harsco, East Stroudsburg, Pa. 18301, under the name P-K ZIG-ZAG TM Continuous Liquid-Solids Blender, and the operation and construction of the same is described in the Patterson-Kelley Bulletin ZZ-1.

As the mass of polymer particles is being tumbled in the drum, the kicker blades cause at least some of the particles to become dispersed in the atmosphere of the drum, and the jet ports and the spray head are oriented to spray liquid curing agent onto the dispersed particles of polymer therein. The curing agent in liquid form is thus incrementally incorporated into the mass of particles in the drum tumbler by spraying the liquid curing agent onto particles of the polymer while they are separated from the mass and dispersed in the atmosphere in the drum.

The liquid curing agent and the polymer granules are continuously fed to the drum tumbler in proportions well known in the art for effecting a curable polymer, and the mass having the curing agent thus incorporated therein is continuously passed on to the tumble-only step where the tumbling of the mass is continued to effect equilibration between the polymer particles and the curing agent. Suitable heating means is provided in both the drum tumbler and the V-shaped tumbler to maintain the desired temperature conditions during the tumbling in these two steps.

The equilibrated mass in the V-shaped tumbler is continuously withdrawn therefrom and fed to an unheated tumbler or like cooling device in which tumbling is continued until a dry, discrete, free-flowing mass of polymer particles is obtained.

Polymers, as a rule, do not have a set melting point and sometimes tend to become soft or sticky before they melt. Accordingly, the maximum temperature permissible in these two tumbling steps must be that at which agglomeration during the tumbling does not take place. This may or may not coincide with the melting point of the polymer but, in any case, those skilled in the art are capable of maintaining conditions of temperature in the two tumbling steps described which will not bring about coalescence or agglomeration of the particles.

The final tumbling step or cooling step is optional and is used only when continued agitation of the mass is needed to prevent caking, which might otherwise occur if a heated mass of polymer particles is allowed to stand undisturbed.

It is to be understood, however, that the invention is not limited to the use of any particular blender and that in the broad asepct of the invention, all that is required is that the curing agent be incorporated into a mass of polymer particles in the first of two separate and discrete tumbling steps and equilibration between the curing agent and the polymer is effected in the second of the two steps without further addition of curing agent, especially if the incorporation of the curing agent is effected by spraying liquid curing agent onto the particles of the polymer while they are dispersed in the atmosphere of the tumbler or blender.

As the present invention is an improvement in the three types of processes disclosed in U.S. Pat. No. 3,736,173, it is useful in processing any polyolefin polymer that the prior art processes are capable of processing. Moreover, as pointed out above, the process of the invention is useful in processing polymer mixtures or blends which can not be processed by the process covered by U.S. Pat. No. 3,736,173.

The invention is particularly useful in the processing of the so-called ethylene-propylene rubbers, such as ethylene-propylene copolymer types, ethylene-propylene-diene terpolymer types, including semi-crystalline types, such as Nordel TM 2722, and ethylene copolymerized with ethyl-vinyl-acetate. Blends of several polymers also are contemplated, for example, a blend of low density polyethylene homopolymer and ethylene-propylene-diene terpolymer types.

Ethylene-propylene rubbers suitable for use in the invention are well known in the art. Suitable such material includes EPR, ethylene-propylene copolymer rubber and EPDM, ethylene-propylene-non-conjugated diene rubber. The former is a copolymer or ethylene and propylene and the latter is a terpolymer of ethylene, propylene and a nonconjugated diene such as 1,4-hexadiene, ethylidene norbornene, and dicyclopentadiene. Suitable such ethylene-propylene rubbers are disclosed in U.S. Pat. Nos. 3,658,752, 3,758,613, and 4,078,020. Suitable such ethylene rubbers are obtained by copolymerizing ethylene and propylene in the proportions of 60–85 percent ethylene and 15–40 percent propylene, advantageously 65–82 percent ethylene and 18–35 percent propylene, with or without the inclusion of a minor amount, up to about 5 percent, of a diene such as 1,4-hexadiene, norbornene, alkylidene norbornene, alkenyl norbornene, and dicyclopentadiene.

The polymers useful in the invention can be compounded, as is well known in the art, with additives such as antioxidants, ultraviolet stabilizers, pigments, inorganic fillers, silanes, waxes, fire retardants, and the like.

Suitable such compositions are formulated in the usual manner on a plastics or rubber mill or like kneading-type mill where the additives are thoroughly blended with the polyethylene polymer. Ordinarily, such compositions are taken from the mill, extruded through a pelletizer or into sheets or rods, and cut into pellets having a maximum dimension between about 0.5 and 10 millimeters.

The usefulness of the invention is not limited, however, to such compositions, but is applicable equally to low density polyethylene homopolymers; linear, low density polyethylene homopolymers; ethylene-vinyl acetate copolymers; ethylene-ethyl acrylate copolymers; chlorinated polyethylenes; and chlorosulfonated polyethylenes.

The inert inorganic fillers used in formulating compositions according to the invention are those commonly used in this art and include such things as calcium carbonate, magnesium silicate (talc), silica, hydrated alumina, and various types of clays. One particularly suitable filler is aluminum silicate (clay) which has been calcined and treated with vinyl tris-(2-methoxyethoxy)-silane.

Suitable pigments are titanium dioxide, carbon black, red lead, zinc oxide, and the like.

As flame retarders, bromine compounds are commonly used, for example, decabromodiphenyloxide, ethylene bis tetrabromo-phthalimide, and 1,2,3,4,7,8,9,10,13,13,14,14-dodecachloro-1,4,4a,5,6-,6a,7,10,10a,11,12,12a-dodecahydro-1,-4:7,10 dimethanodibenzo(a,e)cyclooctane, marketed by Hooker Chemical Company under the name of "Dechlorane Plus TM". Halogen-antimony oxide synergistic systems and non-halogenated types may be used.

Sometimes carbon black functions more as a filler than it does as a pigment and it may be incorporated for either or both purposes.

In carrying out the process of the invention, compositions as described above are usually either stockpiled or purchased from suppliers. In such case, it is desirable to preheat the polymer particles to the desired temperature for peroxide absorption before loading them into the blending apparatus described. A continuous tubular dryer is suitable for this purpose.

The temperature to which the polymer particles are to be heated either in the preheater or in the tumbling stages is dependent upon the type of polymer used and the type of curing agent. Thus, with dicumyl peroxide, the temperature should not exceed much above about 150° F. (65° C.), although higher temperatures can be used with higher melting point peroxides, such as α,α-bis-(t-butylperoxy)-diisopropylbenzene.

While kneading-type mixers (Banbury TM -type mixers) can be used effectively in preparing compositions for processing by the process of the invention, they cannot be used effectively for incorporating the curing agent. The temperatures which are obtained in kneading-type mixers tend to cause decomposition of the curing agent or premature curing, so that the throughput must be severely restricted in order to avoid these results and, even then, decomposition or premature curing is not entirely avoided. By combining a kneading-type mixer and a ZIG-ZAG TM mixer, as described above, maximum efficiency of the kneading-type mixer is obtainable and the disadvantages of the tumbling process of the Japanese Patent and the high speed blender process of U.S. Pat. No. 3,736,173 are avoided.

DESCRIPTION OF THE PREFERRED EMBODIMENTS

The invention may be more fully understood by reference to the following example. Parts herein are by weight unless otherwise specified.

A material having the following composition was used in this example and in the control.

PREPARATION

| POLYMER | |
|---|---|
| EPDM (terpolymer of ethylene-propylene-diene) (Nordel TM 2722 by E. I. DuPont deNemours & Co., Inc.) | 90 parts |
| LDPE (Low density polyethylene polymer of 2.5 melt index) | 10 parts |
| ADDITIVES: | |
| Silane treated calcined clay (inorganic filler) | 60 parts |
| Antioxidant (Polymerized 1,2-(dihydro-2,2,4-tri-methyl-quinoline)-(Agerite Resin D TM by R. T. Vanderbilt) | 1.5 parts |
| Zinc Oxide | 1.5 parts |
| Pb$_3$O$_4$ (Red Lead) | 4.5 parts |
| Paraffin Wax (140° F. melt point) | 5 parts |
| Vinyl tris-(2-methoxyethoxy) silane | 1 parts |
| Dicumyl Peroxide | 2.5 parts |

Additives are shown in parts per hundred parts of polymer.

All ingredients, except the dicumyl peroxide, were charged into a Banbury TM type mixer operating at 40 RPM. The matrix from these ingredients was discharged from the mixer at 320° F. (160° C.). The matrix (batch) was then dumped into the hopper of a strainer-extruder, and extruded and strained through a 120 mesh screen into an 8 inch × ⅛ inch thick strip. This strip was then cooled in 60° F. (15.5° C.) water, dried, and then fed into a dicer and diced into pellets approximately ⅛ inch × ⅛ inch. The pellets were then set aside awaiting further processing.

CONTROL

These pellets together with the stated amount of dicumyl peroxide were charged into the Banbury TM type mixer operating at 20 RPM. The matrix (massed pellets with mixed-in peroxide) was discharged from the mixer at 225° F. (107° C.) and fed into the hopper of a strainer-extruder (no screens were used to avoid heat build-up) and extruded into a strip 8 inch × ⅛ inch thick. This strip was then cooled in 60° F. (15.5° C.) water and diced into approximately ⅛ inch × ⅛ inch pellets. These pellets were then packaged for shipment to a wire plant for application to wire as insulation.

EXAMPLE

Pellets from the preparation were fed into a continuous tubular dryer and heated to 120° F. (49° C.). From this dryer they were weighed on a continuous weigh belt into the hopper of a ZIG-ZAG TM blender and dicumyl peroxide was fed thereto as a liquid at 120° F. (49° C.) and metered by a positive displacement pump, in the stated amount in proportion to the pellets, into the liquid dispensing device of the ZIG-ZAG TM blender which included the drum tumbler with its rotary spray head provided with kicker blades and V-type tumbler in tandem as described above. The pellets absorbed the dicumyl peroxide in homogeneous proportions and were cooled and packaged for shipment to a wire plant for application to wire as an insulation.

The rates for the control are approximately 1200 lbs. per hour average for both Banbury TM steps and the rates for the example are 2500 lbs. per hour to 3000 lbs. per hour in the same Banbury TM. Both the control and the example were applied to 1.2 mm on a #12 awg solid aluminum wire by a crosshead extruder and crosslinked or cured in 225 psi steam with 1 minute exposure. The physical properties were identical and the electrical properties did not differ in any significant manner. In this regard, see the results given in the following table.

TABLE

Properties after immersion in 90° C. water, 600 V AC applied

| Lot No. IR meg ohms/M ft | Example | Control |
|---|---|---|
| 1 d. | 2272/2272 | 1650/1706 |
| 1 wk. | 2369/2439 | 2016/2024 |
| 2 wks. | 2659/2702 | 2304/2272 |
| 1 mo. | 2906/2941 | 2688/2793 |
| 2 mos. | 3125/3012 | 2778/2512 |

SIC, micro-

TABLE-continued

| Properties after immersion in 90° C. water, 600 V AC applied | | | | |
|---|---|---|---|---|
| microfarads | 1575 v/mm | 3150 v/mm | 1575 v/mm | 3150 v/mm |
| 1 d. | 2.66/2.69 | 2.66/2.69 | 2.71/2.79 | 2.71/2.79 |
| 1 wk. | 2.67/2.67 | 2.69/2.69 | 2.71/2.72 | 2.79/2.80 |
| 2 wks. | 2.69/2.72 | 2.70/2.72 | 2.74/2.81 | 2.74/2.81 |
| 1 mo. | 2.72/2.75 | 2.72/2.75 | 2.75/2.82 | 2.76/2.82 |
| 2 mos | 2.76/2.77 | 2.76/2.78 | 2.81/2.89 | 2.8,/2.89 |
| Power Factor | | | | |
| 1 d. | .75/.75 | .76/.76 | .67/.76 | .68/.78 |
| 1 wk. | .57/.61 | 57/.63 | .50/.63 | .52/.66 |
| 2 wks | .58/.56 | .58/.58 | .49/.62 | .51/.65 |
| 1 mo. | .54/.55 | .55/.57 | .50/.54 | .50/.63 |
| 2 mos. | .54/.56 | .55/.58 | .55/.54 | .56/.57 |

These data indicate that material produced according to the invention (the Example) is competitive with the control material which is a standard commodity approved by wire and cable manufacturers. Considering the flexibility of the process in regard to the wide variety of materials which can be processed thereby, including those containing high concentrations of inorganic filler, and considering the marked increase in throughput, the process of the invention has significant advantages over the prior art. These advantages are not obtained in the process of U.S. Pat. No. 3,736,173 because compositions containing 60 parts of filler per one hundred parts of polymer cannot be processed by the process of the patent.

It is to be understood that the invention is not to be limited to the exact details of operation or exact compounds, compositions, methods, or procedures shown and described, as various modifications and equivalents will be apparent to one skilled in the art.

I claim:

1. In a process for preparing curable polyolefin polymers in which a mass of dry, discrete, free-flowing particles of polyolefin polymer particles is tumbled in admixture with a curing agent effective to cause curing when the finished product is subjected to curing temperature, the improvement which comprises tumbling said mass in two separate and discrete steps in which essentially all of the curing agent is incorporated into said mass in the first tumbling step and equilibration between the curing agent and the polymer is effected in the second tumbling step while maintaining in both tumbling steps a temperature above the melting point of said curing agent but below both the agglomerating temperature and the curing temperature and, at least in the second tumbling step, a temperature which provides equilibration between the curing agent and the polymer; and thereafter tumble-cooling the thus treated mass until a dry, discrete, free-flowing mass of polymer particles is obtained, said process being characterized in that it is not dependent upon a curing agent of high volatility, such as di-tertiary butyl peroxide.

2. A process of claim 1, in which the incorporation of the curing agent is effected by spraying liquid curing agent onto particles of said polymer while they are separated from said mass and dispersed in the atmosphere which envelopes said mass.

3. A process of claim 2, in which the polymer particles are fed continuously to the first tumbling step, the sprayed polymer particles are continuously withdrawn therefrom and continuously fed to the second tumbling step, and the sprayed particles are continuously withdrawn from the second tumbling step and continuously fed to the tumble-cooling step.

4. A process of claim 1 or 2, in which the polyolefin polymer comprises an ethylene-propylene-diene terpolymer.

5. A process of claim 1 or 2, in which the polyolefin polymer is a blend of ethylene-propylene-diene terpolymer and low density polyethylene homopolymer.

6. A process of claim 1 or 2, in which the polyolefin polymer is admixed with an amount of inorganic filler effective to promote diffusion of the curing agent into the polymer particles.

7. A process of claim 1 or 2, in which the polyolefin polymer is admixed with at least about 25% of an inert, inorganic filler.

8. A process of claim 1 or 2, in which the polyolefin polymer is a blend of ethylene-propylene-diene terpolymer and a low density polyethylene homopolymer and in which the polyolefin polymer is admixed with at least about 25% of an inert, inorganic filler.

9. A process of claim 1 or 2, in which the polyolefin polymer particles are shaped, discrete masses having a maximum dimension of between about 0.5 and about 5 millimeters.

10. A process of claim 1 or 2, in which the polyolefin polymer comprises an ethylene-propylene-diene terpolymer and in which the polyolefin polymer particles are shaped, discrete masses having a maximum dimension of between about 0.5 and about 5 millimeters.

11. A process of claim 1 or 2, in which the polyolefin polymer is a blend of ethylene-propylene-diene terpolymer and a low density polyethylene homopolymer and in which the polyolefin polymer is admixed with at least about 25% of an inert, inorganic filler and in which the polyolefin polymer particles are shaped, discrete masses having a maximum dimension of between about 0.5 and about 5 millimeters.

12. A process of claim 1 or 2, in which the starting polyolefin polymer is formed by kneading polyolefin polymer and the kneaded product free of curing agent is formed into discrete shapes having a maximum dimension of between about 0.5 and about 5 millimeters.

13. A process of claim 1 or 2, in which the starting polyolefin polymer is formed by kneading polyolefin polymer with at least about 25% of an inert, inorganic filler and in which the kneaded product free of curing agent is formed into discrete shapes having a maximum dimension of between about 0.5 and about 5 millimeters.

14. A process of claim 1 or 2, in which the polyolefin polymer is at least one member of the group consisting of ethylene-propylene rubber; ethylene-propylene diene rubber; low density polyethylene; linear, low density polyethylene; ethylene-vinyl acetate copolymer; ethylene-ethyl acrylate copolymer; chlorinated polyethylene; and chlorosulfonated polyethylene.

15. The process of claim 1, in which the discrete free-flowing particles of polyolefin polymer fed to the first step are preheated to the tumbling temperature before incorporation of the curing agent.

16. The process of claim 15, in which the preheating is effected in a continuous tubular dryer.

17. The process of claim 2, in which the discrete free-flowing particles of polyolefin polymer fed to the first step are preheated to the tumbling temperature before incorporation of the curing agent.

18. The process of claim 17, in which the preheating is effected in a continuous tubular dryer.

19. A process of claim 1, in which said curing agent is dicumyl peroxide.

20. A process of claim 2, in which said curing agent is dicumyl peroxide.

* * * * *

UNITED STATES PATENT AND TRADEMARK OFFICE
CERTIFICATE OF CORRECTION

PATENT NO. : 4,522,957
DATED : June 11, 1985
INVENTOR(S) : Billy H. Ashley

It is certified that error appears in the above-identified patent and that said Letters Patent is hereby corrected as shown below:

Col. 1, line 12; "3,731,173," should read -- 3,736,173, --

Col. 3, line 63; "asepct" should read -- aspect --

Col. 7, approximately line 8, TABLE-continued, last column, last line of the first set of figures; "2.8,/2.89" should read -- 2.81/2.89 --

Signed and Sealed this

Twenty-sixth Day of November 1985

[SEAL]

Attest:

DONALD J. QUIGG

Attesting Officer

Commissioner of Patents and Trademarks